June 9, 1964   F. S. CAMPBELL   3,136,503
FLIGHT CONTROL APPARATUS
Filed Jan. 17, 1963

INVENTOR.
FRANCIS S. CAMPBELL
BY
ATTORNEY

United States Patent Office 3,136,503
Patented June 9, 1964

3,136,503
FLIGHT CONTROL APPARATUS
Francis S. Campbell, Commack, N.Y., assignor to Sperry Rand Corporation, Great Neck, N.Y., a corporation of Delaware
Filed Jan. 17, 1963, Ser. No. 252,207
10 Claims. (Cl. 244—77)

This invention relates in general to aircraft automatic flight control apparatus useful in bracketing a radio-defined course and more particularly to the manner in which a beam displacement signal is integrated to provide a signal for cancelling the tendency of the craft to stand off from the defined course.

U.S. Patent 3,038,156, issued June 5, 1962, and assigned to the present assignee, describes one technique for eliminating course standoff, and over this and similar techniques the present invention is an improvement.

In bracketing a beam, i.e., a radio-defined course, it had been customary early to apply to the craft automatic flight control system an error signal resulting from the algebraic addition of signals representing craft roll ($\phi$), beam displacement (B), and a measure of the craft approach rate to the beam, e.g., cross beam rate ($\dot{B}$) and/or craft heading with respect to the beam ($\Delta H$). In systems using the "cross beam rate" measure ($\dot{B}$), however, asymmetric thrust of the craft prevented the craft from ever assuming the center of the captured beam; that is, with asymmetric thrust the craft must bank ($\phi \neq 0$) to hold course ($\dot{B}=0$), thereby requiring a beam displacement B, if $\phi+B+\dot{B}=0$. In systems using the "heading with respect to the beam" measure ($\Delta H$), cross wind often prevented the craft from ever assuming the center of the captured beam; that is, with a signal $\Delta H$ (representing the amount the craft must crab in the presence of a cross wind), the craft must stand off from the beam center in proportion to a displacement signal B for the craft to hold course ($\phi=0$), if $B+\Delta H+\phi=0$.

To cancel beam standoff, it had been the practice to add a fourth signal to the above control equations, such signal being the integral of beam displacement $\int B$, which settles out, in either case, to equal and cancel the signal causing beam standoff. For example, in the first mentioned standoff situation involving asymmetric thrust, the signal $\int B$ eventually gets to equal the signal $\phi$ causing standoff so that B and $\dot{B}$ can both go to zero; in the second mentioned standoff situation $\int B$ eventually equals the crab angle signal $\Delta H$ to permit B and $\dot{B}$ to equal zero.

As noted in the above-mentioned patent, inclusion of the integrator signal $\int B$ in the craft control expression too early, i.e., when the craft is substantially displaced from the beam center (large B), can cause substantial oscillations about the beam center as the craft flies to capture the beam; therefore it was there suggested that integration of the beam displacement signal be started only after the craft cross beam rate becomes zero, i.e., when the craft is near the beam center (small B). As an alternative, it has been suggested also that the beam displacement signal B be integrated only after there is other evidence of nearness of the craft to the beam center, e.g., when there are various combinations of minimums for craft bank angle, beam displacement, and cross beam rate. In certain cases however, indeed those cases where integration of the beam displacement signal is most critically needed, the integrator (with either of these suggested techniques) can never be turned "on." For instance, in a system where the integrator is turned "on" only when the cross beam rate $\dot{B}$ becomes zero the cross wind may be so severe that the craft never gets to the beam; hence the cross beam rate never goes to zero and the integrator remains "off." Also, in a system that requires a certain minimum bank angle before signal integration can proceed, a severe asymmetric craft thrust can prevent the integrator from being turned "on." For example, with one engine completely inoperative, the craft will have to bank ($\phi \neq 0$) considerably to hold course ($\dot{B}=0$), thereby necessitating a large displacement signal B, if $\phi+B+\dot{B}=0$. With a large displacement signal B, signal integration should proceed, but because of the excessive craft bank angle, the integrator is kept "off."

To overcome the attendant disadvantages of the prior art, i.e., overshooting the beam because the integrator is turned on too early or beam standoff because the integrator cannot get turned on, the present invention continually includes in the craft control expression a signal representative of the integral of beam displacement ($\int B$), however with more and more emphasis as the craft nears the beam center. Hence, when the craft is considerably displaced from the beam center, the integrator appears "off" for all intents and purposes; near the beam center however the integrator does its job as heretofore, its gain or responsiveness being at its peak to hold the beam center once the craft acquires it.

A principal object of the invention is to provide automatic apparatus for controlling an aircraft during a beam bracketing maneuver.

Another object of the invention is to provide aircraft beam bracketing automatic control apparatus that continuously receives and utilizes a signal representing the integral of beam displacement, however with increasing emphasis as the craft nears the center of the beam.

Another object of the invention is to provide aircraft beam bracketing automatic control apparatus that continuously receives and utilizes an integral of beam displacement signal, said signal being magnified inversely as a function of the craft rate of movement with respect to the beam.

Another object of the invention is to provide aircraft beam bracketing automatic control apparatus that continuously receives and utilizes an integral of beam displacement signal, said signal being magnified inversely as a function of a signal representing the craft rate of approach to or from the baem.

Another object of the invention is to provide aircraft beam bracketing automatic control apparatus that continuously receives and utilizes an integral of beam displacement signal, said signal being magnified inversely as a function of a signal representing the craft heading with respect to the heading of the beam.

The invention will be described with reference to the figures wherein.

Figure 1:
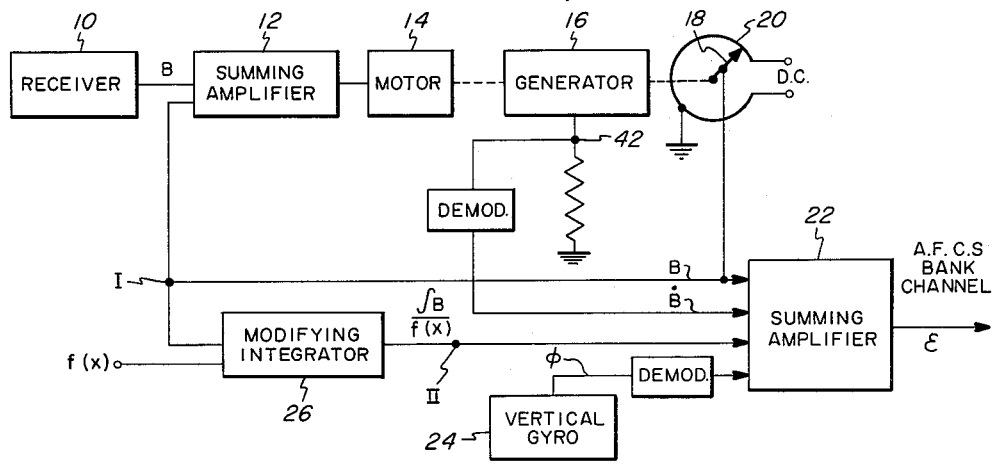
FIG. 1 is a block diagram depicting the general nature of the invention.

Referring to FIG. 1, a radio receiver 10, e.g., a VOR or localizer receiver as the case may be, applies during a beam bracketing maneuver a beam displacement signal B to a summing amplifier 12. A motor (14)-generator (16) set receives the amplifier 12 output signal and drives the wiper 18 of a potentiometer 20. The signal on the wiper 18 is fed back to the amplifier 12 to cancel the receiver output signal B and thereby cause the motor 14 to drive to a null position, the signal on the wiper 18 being the signal B.

A summing amplifier 22, the function of which is to provide a control error signal by algebraically adding its applied signals, receives the signal B on the wiper 18 and in addition receives from the generator 16 a signal $\dot{B}$ representing the rate that the displacement signal changes (which of course is indicative of the craft rate of approach to the beam being bracketed). If desired, a signal representing the instantaneous craft heading with respect to the heading of the beam could be used (singularly or summed with the radio rate signal $\dot{B}$) in place of the signal $\dot{B}$, this being indicated in U.S. Patent 3,038,156.

A vertical gyro 24 providing a signal $\phi$ representative of the craft bank angle applies its output signal to the summing amplifier 22. The signal B appearing on the wiper 18 is applied to a modifying integrator 26, forms of which are described in detail later, which receives also a signal $f(x)$, $x$ being some measure of the craft displacement from the center of the beam being bracketed. For example, $x$ preferably is either representative of the rate of approach relative to or the heading with respect to the beam in question: for large displacements, approach rates and relative headings during bracketing are large; for small displacements, such rates and headings are small. The integrator 26 output signal, which is applied to the summing amplifier 22, is applied with more or less emphasis depending on the magnitude of the signal $f(x)$. That is, when the signal $f(x)$ applied to the integrator 26 is substantial, the signal applied to the summing amplifier 22 by the integrator 26 can never be greater than a certain minimum value; when the signal $f(x)$ is small the signal applied to the summing amplifier 22 by the integrator 26 can be any value up to a certain maximum value.

Figures 2, 4:
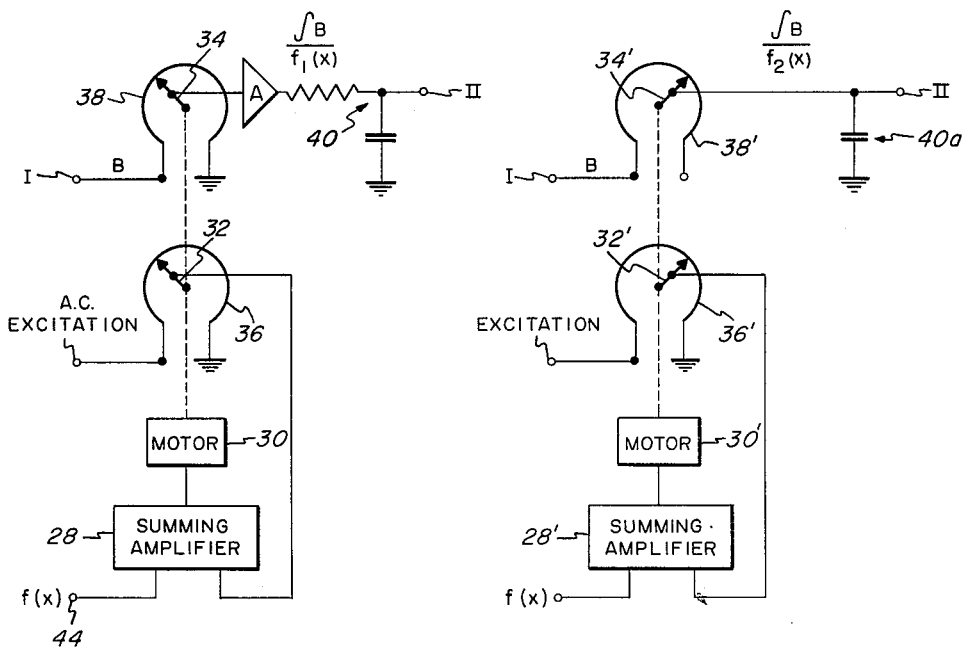
FIG. 2 is a schematic diagram of a circuit for use in one form of the invention.
FIG. 4 is a schematic diagram of a circuit for use in another form of the invention.

Referring to FIG. 2, one form of modifying integrator adapted to be connected to points I and II of FIG. 1 has a summing amplifier 28 receiving the signal $f(x)$ and applying its output signal to a motor 30 which drives the wipers 32 and 34 of potentiometers 36 and 38 respectively. The signal on the wiper 32 is fed back and applied to the amplifier 28 to cancel the signal $f(x)$.

In this form of the invention the signal B appearing at point I is applied across the potentiometer 38 so that only a fraction of the signal B is applied to an integrating circuit 40 through an isolation amplifier 39 (necessary to prevent the potentiometer from affecting the time constant of the integrating circuit). Hence, the integrator 40 output signal has a limit depending on the position of the wiper 34, large signals $f(x)$ moving the wiper 34 generally clockwise (to lower the limit for the signal apearing at point II) and small signals $f(x)$ moving the wiper 34 generally counterclockwise (to increase the aforementioned limit). As stated above, the signal $f(x)$ can take a variety of forms, i.e., $f(x)$ can be $\dot{B}$, $\Delta H$, etc. To be realized, however, is the fact that the wiper 34 of the potentiometer 38 should be positioned with respect to the "magnitude" of the signal $f(x)$, and completely without regard to the polarity of such signal. That is, it makes no difference from which side of the beam the bracketing maneuver is comenced, or whether the craft is instantaneously moving to or from the beam. Accordingly, if the signal used to change the limits for the integrator 40 is the beam rate signal $\dot{B}$ (i.e., $f(x)=\dot{B}$) appearing at point 42 of FIG. 1, the circuit of FIG. 3 must be connected between the point 44 shown in FIG. 2 and the point 42 shown on FIG. 1. Then, desensitizing with respect to signal polarity will be effected.

Figure 3:
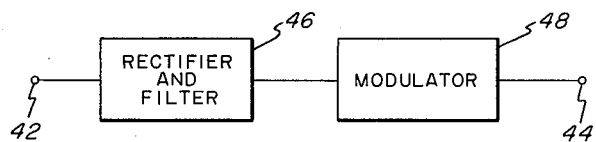
FIG. 3 is a block diagram of a circuit useful with the apparatus of FIG. 2.

The circuit of FIG. 3 includes a rectifier-filter element 46 which produces a D.C. signal proportional to the amplitude of its applied A.C. signal (regardless of the phase of the A.C. signal), such D.C. signal being applied to a modulator 48 for reconversion to an A.C. signal of known phase. The modulator 48 is necessary because the amplifier 28, motor 30, and potentiometer 36 of FIG. 2 are A.C. signal responsive.

If, instead of using the beam rate signal $\dot{B}$ for the signal $f(x)$, it is desired to use a heading signal $\Delta H$ (as may be taken from a course selector of the type described in U.S. Patent 3,058,698, filed in the name of the instant inventor) then such signal, since it also can be either of two phases, must be applied through the circuit of FIG. 3 to the modifying integrator of FIG. 2.

The circuit of FIG. 2 operates to divide the signal B by a value dependent on the signal $f(x)$, thereby causing the integral signal at point II to vary accordingly. A corollary of this technique would be first to integrate the signal B directly, and then divided such integral signal by a signal $f(x)$.

Referring to FIG. 4, another form of course which may be connected to points I and II of FIG. 1 has an amplifier 28', mortor 30', and two potentiometers 36' and 38' excited and operated in the same manner as the elements described with respect to FIG. 2, the potentiometer 38' here however having one contact ungrounded so as to be in effect a variable resistance or rheostat. The wiper 34' of the potentiometer 38' is connected directly to the point II and to a capacitor 40a, the free end of which is grounded. Hence, the variable resistance and capacitor 40a together form an integrating circuit the time constant of which depends on the rotational position of the wiper 34'. For large signals $f(x)$, the wiper 34' is driven generally clockwise to make the time constant large; for small signals $f(x)$ the wiper 34' is diven generally counterclockwise to make such time constants small. Therefore, when the craft is substantially displaced from the beam and has, for example, a large beam rate signal $\dot{B}$, the capacitor 40a has difficulty charging (because of the large resistance of the variable resistor), whereas near the beam the capacitor 40a is substantially free to charge to a level equal to the signal B. In this way the aforementioned maximum and minimum values for the signal apearing at point II may be provided. Note should be made that the techniques of FIGS. 2 and 4 may be combined so that the integrator output is modified simultaneously in accordance with both gain and time constant considerations.

While the invention has been described in its preferred embodiments, it is to be understood that the words which have been used ar words of description rather than of limitation and that changes within the purview of the appended claims may be made without departing from the true scope and spirit of the invention in its broader aspects.

What is claimed is:

1. Apparatus for producing a control signal for use in controlling a craft while bracketing a defined course comprising summing means producing a signal representing the algebraic sum of its applied signals, means applying to said summing means a signal proportional to the craft displacement from said course, means applying to said summing means a signal that varies in proportion to the craft rate of approach to said course, means applying to said summing means a signal representing the bank angle of said craft, means continuously integrating the signal proportional to the craft displacement from said course, and means receiving a signal that increases and decreases respectively when said craft nears and departs from said course, said last-named means cooperating with said integrating means to reduce the output signal therefrom in proportion to the signal that increases and decreases respectively when the craft nears and departs from said course, said reduced output signal from said integrating means being applied to said summing means, whereby the summing means output signal is said control signal.

2. Apparatus for producing a control signal for use in controlling a craft while bracketing a defined course comprising summing means producing a signal representing the algebraic sum of its applied signals, means applying to said summing means a signal proportional to the craft displacement from said course, means applying to said summing means a signal that varies in proportion to the craft rate of approach to said course, means applying to said summing means a signal representing the rate that said signal proportional to the craft displacement from said course changes, means applying to said summing means a signal representing the bank angle of said craft, means continuosuly integrating the signal proportional to the craft displacement from said course, and means receiving the signal representing the rate that said displacement proportional signal changes cooperating with said integrating means to reduce the output signal therefrom in proportion to the magnitude of the signal representing the rate that the displacement proportional signal changes, said reduced output signal from said integrating means being applied to said summing means, whereby the summing means output signal is said control signal.

3. Apparatus for producing a control signal for use in controlling a craft while bracketing a defined course comprising summing means producing a signal representing the algebraic sum of its applied signals, means applying to said summing means a signal proportional to the craft displacement from said course, means applying to said summing means a signal that varies in proportion to the craft rate of approach to said course, means applying to said summing means a signal representing the craft heading with respect to the heading of said defined course, means applying to said summing means a signal representing the bank angle of said craft, means continuously integrating the signal proportional to the craft displacement from said course, and means receiving the signal representing the craft heading with respect to the heading of said defined course cooperating with said integrating means to reduce the output signal therefrom in proportion to the magnitude of the signal representing the craft heading with respect to the heading of said defined course, said reduced output signal from said integrating means being applied to said summing means, whereby the summing means output signal is said control signal.

4. Apparatus for use with an aircraft automatic flight control system when it is desired to cause the craft to fly along a defined course and thereby cancel a signal representing the craft displacement from said course comprising integrating means continuously receiving said displacement signal, means providing a signal that increases and decreases when the craft rate of approach with respect to the course respectively increases and decreases, and means receiving said signal that increases and decreases cooperating with said integrating means to reduce the output signal from said integrating means in proportion to the magnitude of said signal that increases and decreases.

5. The apparatus of claim 4 wherein said means providing a signal that increases and decreases produces a signal representing the rate that said displacement signal changes.

6. The apparatus of claim 4 wherein said means providing a signal that increases and decreases produces a signal representing the craft heading with respect to the heading of said course.

7. In an aircraft automatic pilot, apparatus for use in guiding the craft so that it assumes a desired course comprising means providing a signal representing the bank angle of said craft, means producing a signal representing the craft displacement from said course, means producing a signal representative of the craft rate of departure or approach with respect to said course, integrating means receiving said course displacement signal, means reducing the output signal from said integrating means in proportion to the craft rate of approach or departure with respect to said course, and summing means receiving said bank angle signal, said displacement signal, said rate signal and said reduced integrated course displacement signal to produce a control signal representing the algebraic sum of all said signals applied to said summing means, whereby said control signal may be applied to the bank channel of said automatic pilot and thereby cause said craft to assume the desired course.

8. In an aircraft automatic pilot, apparatus for use in guiding the craft so that it assumes a desired course comprising means providing a signal representing the bank angle of said craft, means producing a signal representing the craft displacement from said course, means producing a signal representative of the craft rate of departure or approach with respect to said course, integrating means receiving said course displacement signal, means receiving said rate signal reducing in accordance with the magnitude of that signal the output signal from said integrating means, and summing means receiving said bank angle signal, said displacement signal, said rate signal and said reduced integrated course displacement signal to produce a control signal representing the algebraic sum of all said signals applied to said summing means, whereby said control signal may be applied to the bank channel of said automatic pilot and thereby cause said craft to assume the desired course.

9. Apparatus for use with an aircraft automatic flight control system when it is desired to cause the craft to fly along a defined course and thereby cancel a signal representing the craft displacement from said course comprising integrating means, means continuously receiving said displacement signal and applying its output signal to said integrating means, means providing a signal that increases and decreases when the craft approach rate with respect to the course respectively increases and decreases, and means receiving the last-mentioned signal cooperating with the means continuously receiving said displacement signal to reduce its output signal in proportion to the magnitude of the signal that increases and decreases.

10. Apparatus for use with an aircraft automatic flight control system when it is desired to cause the craft to fly along a defined course and thereby cancel a signal representing the craft displacement from said course comprising integrating means continuously receiving said displacement signal and having a variable time constant of integration, means providing a signal that increases and decreases when the craft rate of approach with respect to the course respectively increases and decreases, and means receiving said signal that increases and decreases cooperating with said integrating means to increase the time constant of said integrating means in proportion to the magnitude of said signal that increases and decreases.

References Cited in the file of this patent
UNITED STATES PATENTS

| | | |
|---|---|---|
| 3,032,756 | Tull | May 1, 1962 |
| 3,057,584 | Bertoi | Oct. 9, 1962 |